(12) United States Patent
Heo

(10) Patent No.: US 11,590,949 B2
(45) Date of Patent: Feb. 28, 2023

(54) HYDRAULIC UNIT FOR BRAKE SYSTEM

(71) Applicant: Hyundai Mobis Co., Ltd., Seoul (KR)

(72) Inventor: Ran Heo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/938,469

(22) Filed: Jul. 24, 2020

(65) Prior Publication Data

US 2021/0024047 A1 Jan. 28, 2021

(30) Foreign Application Priority Data

Jul. 26, 2019 (KR) ........................ 10-2019-0090777

(51) Int. Cl.
| | |
|---|---|
| *B60T 8/40* | (2006.01) |
| *B60T 17/02* | (2006.01) |
| *F16L 55/04* | (2006.01) |
| *B60T 11/34* | (2006.01) |
| *B60T 8/18* | (2006.01) |
| *B60T 8/26* | (2006.01) |
| *B60T 11/236* | (2006.01) |
| *F04B 53/00* | (2006.01) |

(52) U.S. Cl.
CPC ............ *B60T 11/34* (2013.01); *B60T 8/4068* (2013.01); *B60T 17/02* (2013.01); *B60T 8/1831* (2013.01); *B60T 8/265* (2013.01); *B60T 11/236* (2013.01); *F04B 53/001* (2013.01); *F16L 55/04* (2013.01)

(58) Field of Classification Search
CPC ...... B60T 8/4068; B60T 8/4872; B60T 11/34; B60T 11/236; B60T 8/1831; B60T 8/265; F16L 55/04; F16L 55/05; F16L 55/045; F04B 53/001

USPC ............................................................ 138/31
See application file for complete search history.

(56) References Cited

U.S. PATENT DOCUMENTS

| | | | | |
|---|---|---|---|---|
| 5,390,995 | A * | 2/1995 | Zirps .......................... | B60T 8/40 |
| | | | | 303/116.1 |
| 6,612,339 | B1 * | 9/2003 | Wilke ...................... | B60T 8/368 |
| | | | | 138/30 |
| 10,843,671 | B2 * | 11/2020 | Bodmann ............... | B60T 8/368 |
| 11,124,165 | B2 * | 9/2021 | Reuter .................... | B60T 8/409 |
| 2003/0021709 | A1 * | 1/2003 | Okuya ................... | B60T 8/4031 |
| | | | | 417/470 |
| 2007/0114840 | A1 | 5/2007 | Briesewitz et al. | |
| 2012/0326495 | A1 * | 12/2012 | Trageser ................. | B60T 8/368 |
| | | | | 303/119.2 |
| 2017/0021814 | A1 * | 1/2017 | Schumann ............... | F04B 19/22 |
| 2021/0024047 | A1 * | 1/2021 | Heo ....................... | B60T 17/222 |

FOREIGN PATENT DOCUMENTS

| | | | | | |
|---|---|---|---|---|---|
| DE | 19709779 | A1 * | 9/1998 | .............. | B60T 8/368 |
| DE | 102008035943 | A1 * | 3/2009 | ............ | F16L 55/053 |
| DE | 102013009432 | A1 * | 12/2014 | ............ | B60T 13/588 |

(Continued)

*Primary Examiner* — Thomas J Williams
(74) *Attorney, Agent, or Firm* — H.C. Park & Associates, PLC

(57) ABSTRACT

Provided is a hydraulic unit of a brake system including a housing; an oil supply part configured to supply oil to the housing; an oil discharge part configured to discharge the oil, supplied to the housing through the oil supply part, to the outside of the housing; and a piston movably mounted on the housing, and configured to open and close the oil supply part and the oil discharge part.

5 Claims, 6 Drawing Sheets

(56) References Cited

FOREIGN PATENT DOCUMENTS

| | | | | |
|---|---|---|---|---|
| JP | 2019108054 A | * | 7/2019 | .............. B60T 8/368 |
| KR | 10-1042874 | | 6/2011 | |
| WO | WO-2019145820 A1 | * | 8/2019 | .............. B60T 8/368 |

* cited by examiner

HYDRAULIC UNIT FOR BRAKE SYSTEM

CROSS-REFERENCE TO RELATED APPLICATION

This application claims priority from and the benefit of Korean Patent Application No. 10-2019-0090777, filed on Jul. 26, 2019, which is hereby incorporated by reference for all purposes as if set forth herein.

BACKGROUND

Field

Exemplary embodiments of the present disclosure relate to a hydraulic unit for a brake system, and more particularly, to a hydraulic unit for a brake system, in which a piston blocks a flow path between an oil supply part and an oil discharge part such that negative pressure generated by a pump is not transferred to a wheel of a vehicle.

Discussion of the Background

A hydraulic unit is one of constituent parts of an ABS (Anti-lock Brake System), and refers to an integrated hydraulic device which includes a hydraulic source device composed of a pump, a driving motor, a tank and a relief valve or a control valve of the hydraulic source device.

The hydraulic unit is located between a booster which generates pressure by amplifying a driver's force and compressing brake oil and a brake which is mounted on a master cylinder and each wheel and generates a braking force.

When a conventional electronic brake system implements a regenerative braking function, the time during which a normal close circuit is opened is increased. At this time, an excessive amount of oil may be discharged from the wheel of the vehicle, thereby generating negative pressure. Therefore, there is a need for a device capable of solving the problem.

The related art of the present disclosure is disclosed in Korean Patent No. 10-1042874 registered on Jun. 14, 2011 and entitled "Piston-Type Accumulator".

SUMMARY

Exemplary embodiments provide a hydraulic unit for a brake system, in which a piston blocks a flow path between an oil supply part and an oil discharge part such that negative pressure generated by a pump is not transferred to a wheel of a vehicle.

In an embodiment, a hydraulic unit of a brake system may include: a housing; an oil supply part configured to supply oil to the housing; an oil discharge part configured to discharge the oil, supplied to the housing through the oil supply part, to the outside of the housing; and a piston movably mounted on the housing, and configured to open/close the oil supply part and the oil discharge part.

The oil supply part may be disposed to communicate with the housing, and the oil discharge part may be separated from the oil supply part, and disposed to communicate with the housing.

The piston may include: an opening/closing part movably mounted in the housing, and configured to open/close the oil supply part and the oil discharge part; a support part fixed to the inside of the housing; and an elastic part having one side supported by the support part and the other side contacted with the opening/closing part, and configured to provide an elastic force to the opening/closing part.

The opening/closing part may include: an opening/closing body moved in the housing; a stopper formed on one side of the opening/closing body, and configured to block the elastic part from separating from the opening/closing body; and an opening/closing protrusion protruding from the other side of the opening/closing body, surrounding the oil discharge part, capable of being contacted with the oil supply part, and configured to block a flow path to which the oil discharge part and the oil supply part are connected, when contacted with the oil supply part.

The opening/closing protrusion may be contacted with the oil supply part so as to expose a part of the oil supply part.

The opening/closing protrusion may have an inclined part which is inclined downward toward the outside from the oil discharge part.

The elastic part may be configured as a coil spring to surround the outer surface of the stopper.

The piston may further include a sealing part mounted on the outer surface of the opening/closing body, and configured to block oil leakage between the opening/closing body and the housing.

In the hydraulic unit of the brake system in accordance with the embodiment of the present disclosure, the connection flow path between the oil supply part and the oil discharge part may be closed by the operation of the piston, which makes it possible to prevent negative pressure, generated by the pump, from being transferred toward the wheel of the vehicle.

Furthermore, because the flow path between the oil supply part and the oil discharge part is simply opened/closed by the operation of the piston, the unit cost of the product can be reduced to improve the productivity. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
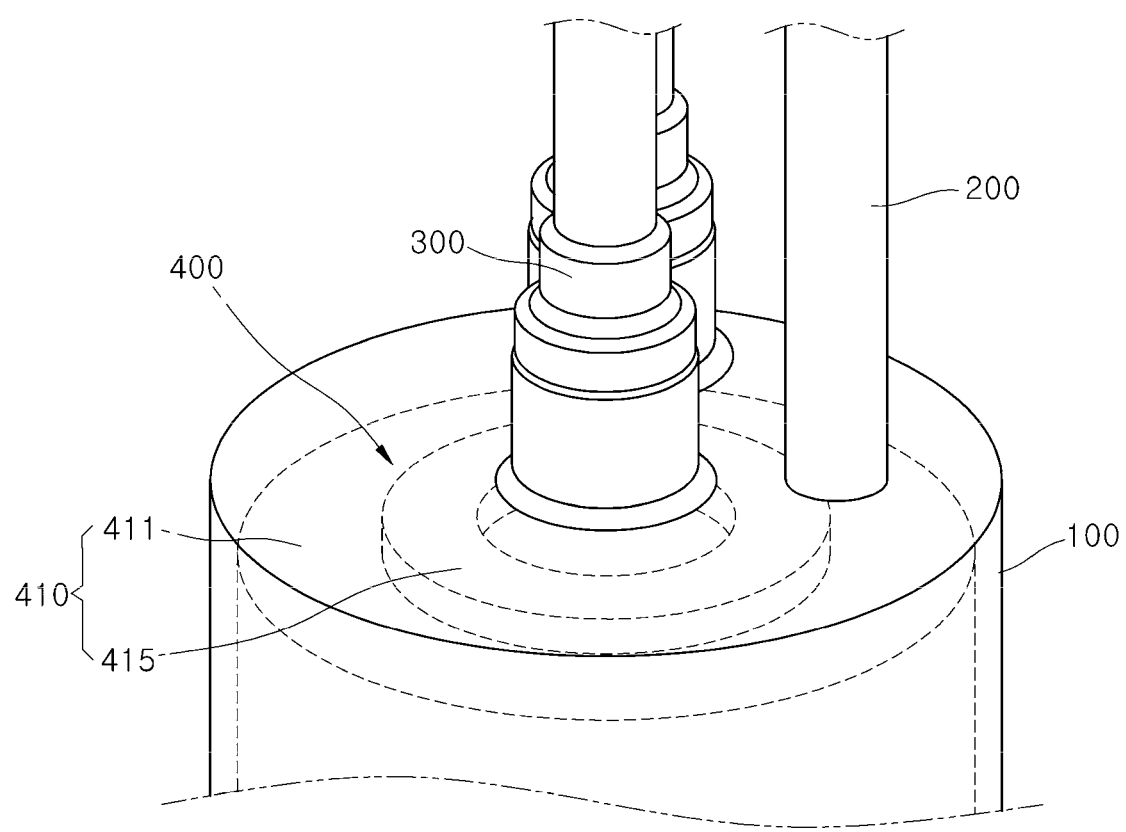
FIG. 1 is a perspective view schematically illustrating a hydraulic unit of a brake system in accordance with an embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, a hydraulic unit of a brake system will be described below with reference to the accompanying drawings through various exemplary embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 2:
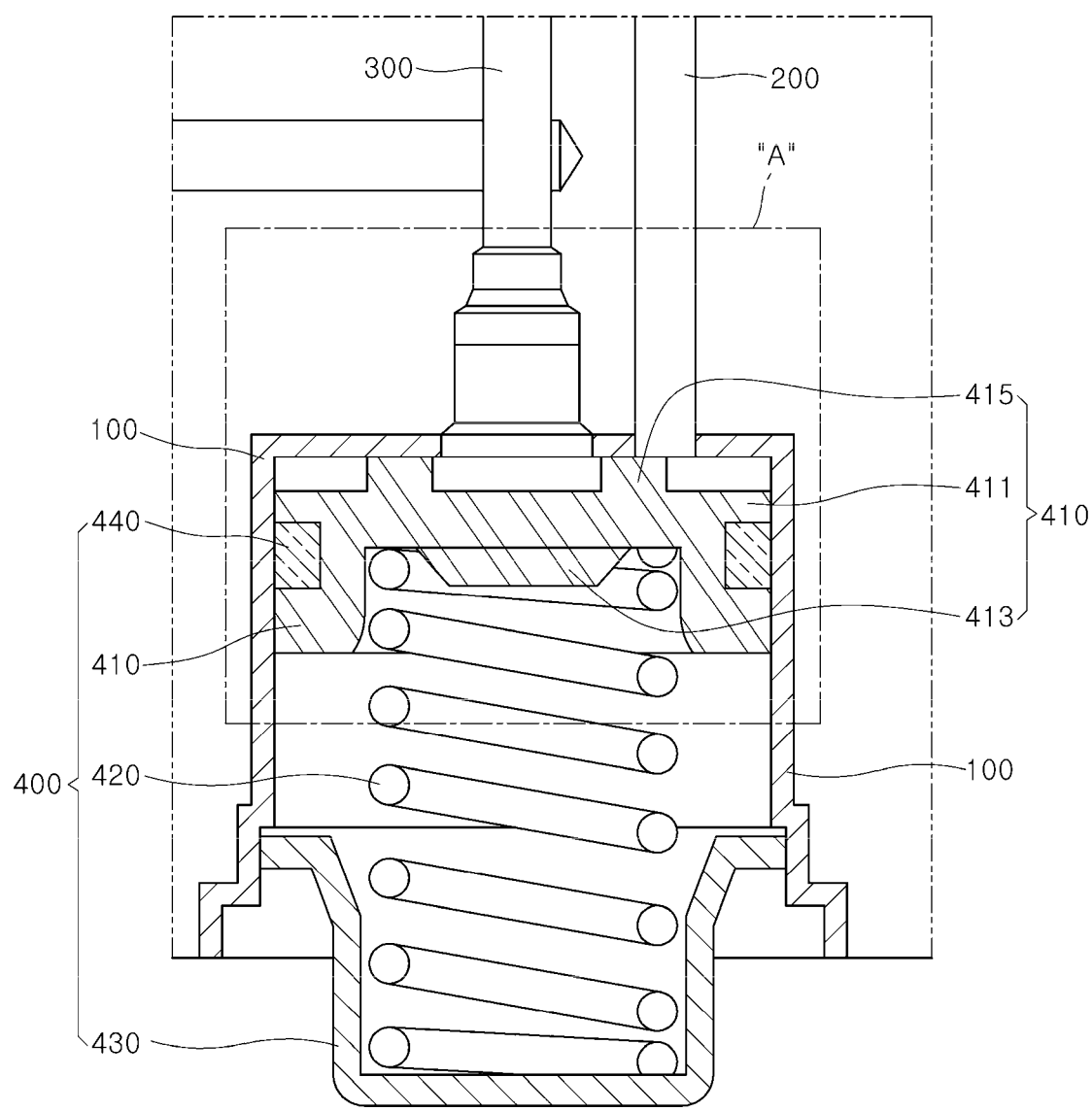
FIG. 2 is a cross-sectional view schematically illustrating the hydraulic unit of the brake system in accordance with the embodiment of the present disclosure.
Figure 3:
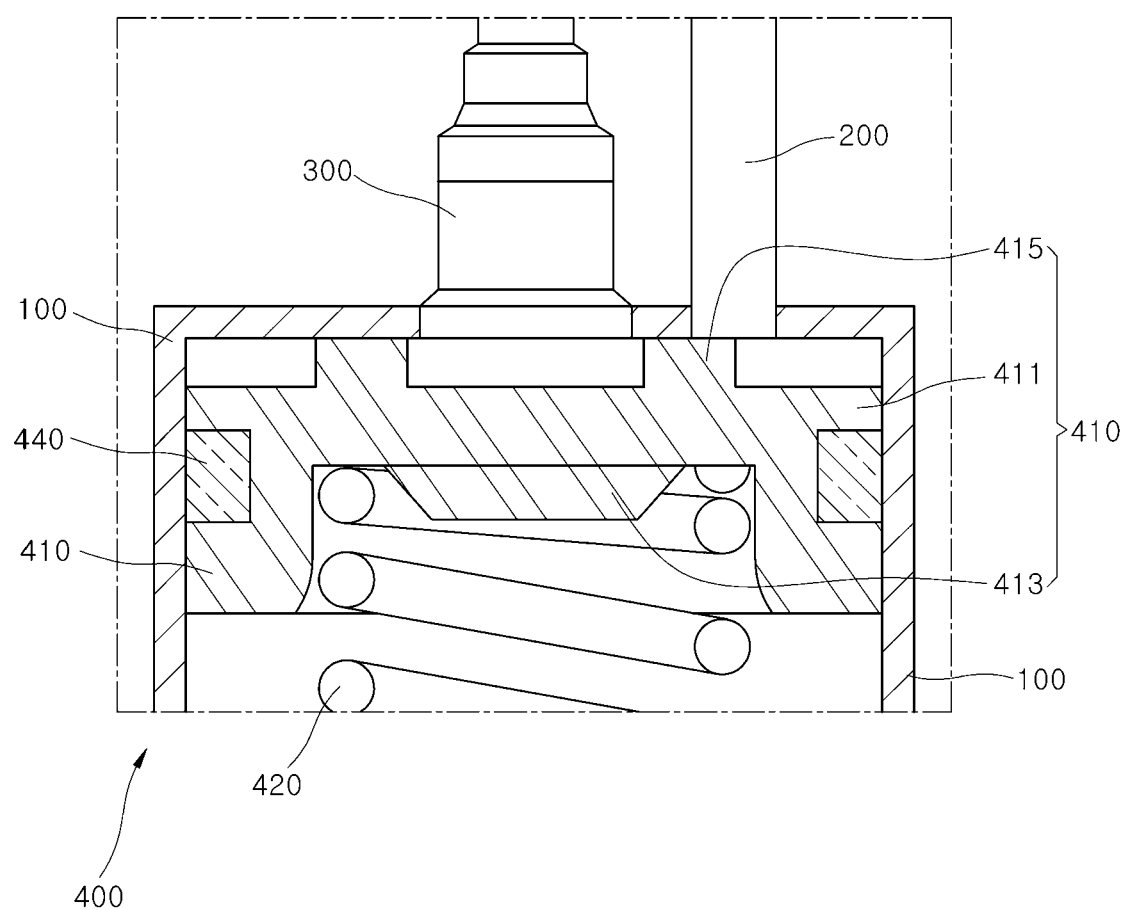
FIG. 3 is an expanded cross-sectional view schematically illustrating a part of the hydraulic unit of the brake system in accordance with the embodiment of the present disclosure.
Figure 4:
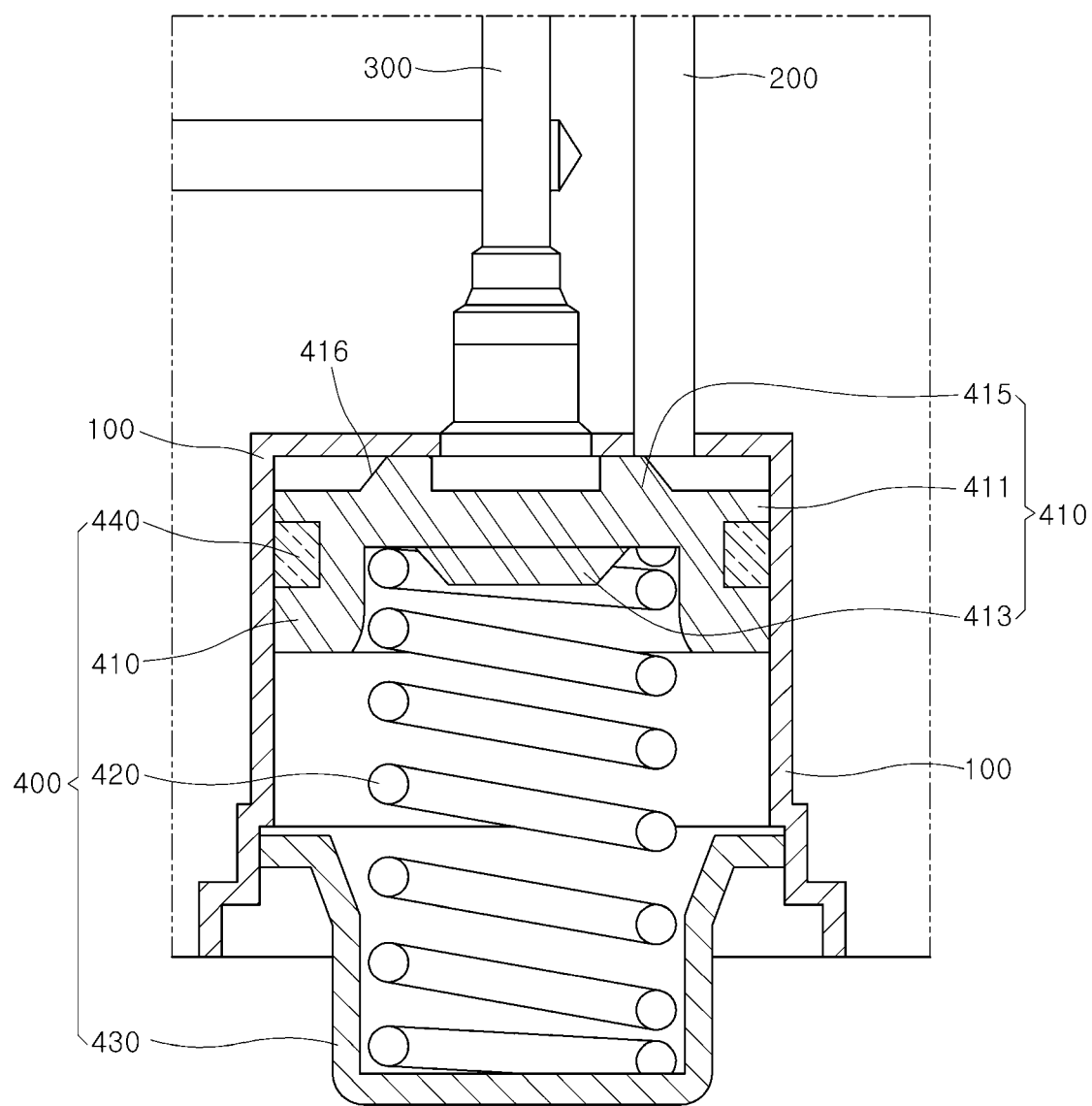
FIG. 4 is a cross-sectional view schematically illustrating a hydraulic unit of a brake system in accordance with another embodiment of the present disclosure.
Figure 5:
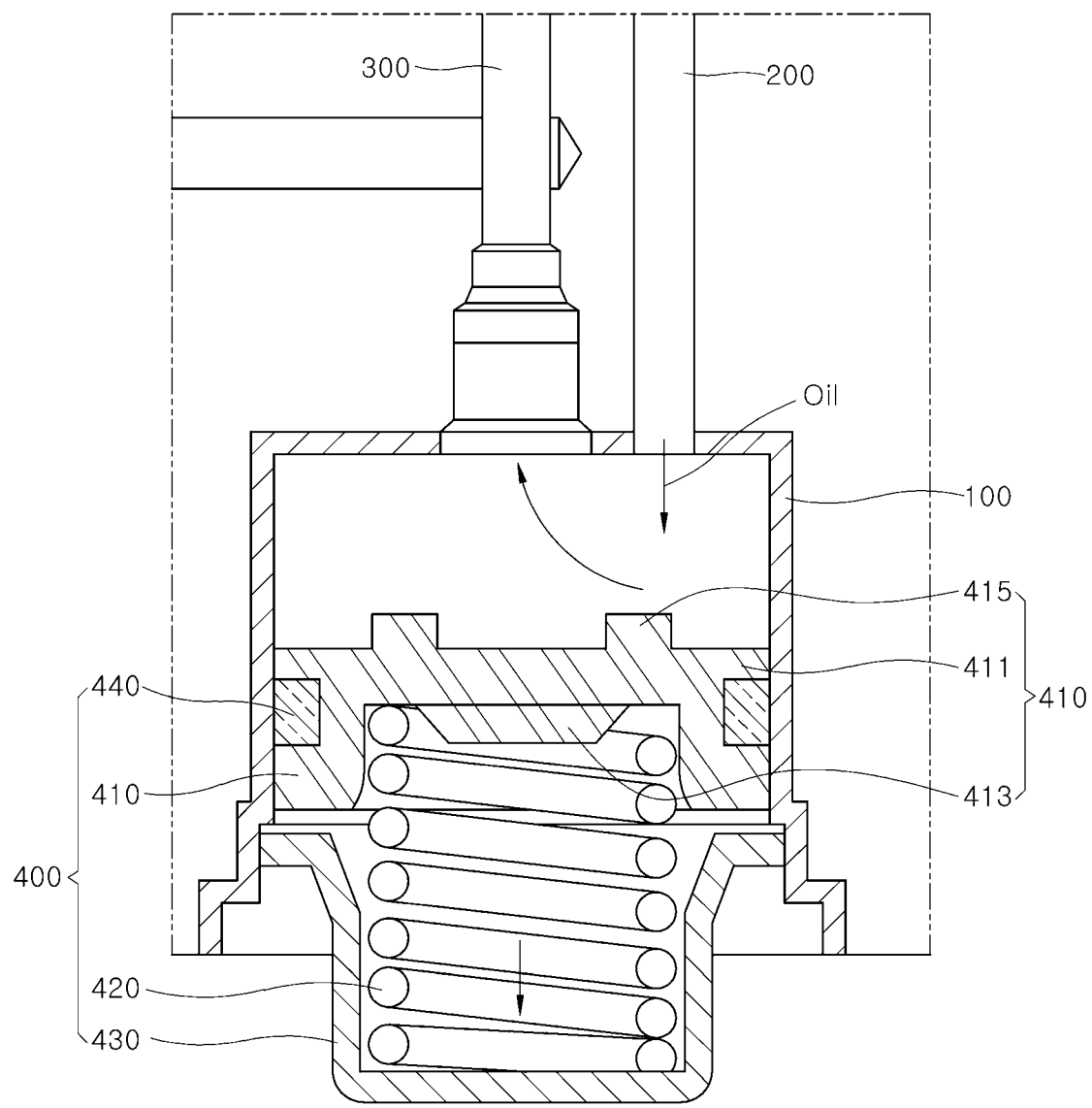
FIGS. 5 and 6 are cross-sectional view schematically illustrating an operation of the hydraulic unit of the brake system in accordance with the embodiment of the present disclosure.
Figure 6:
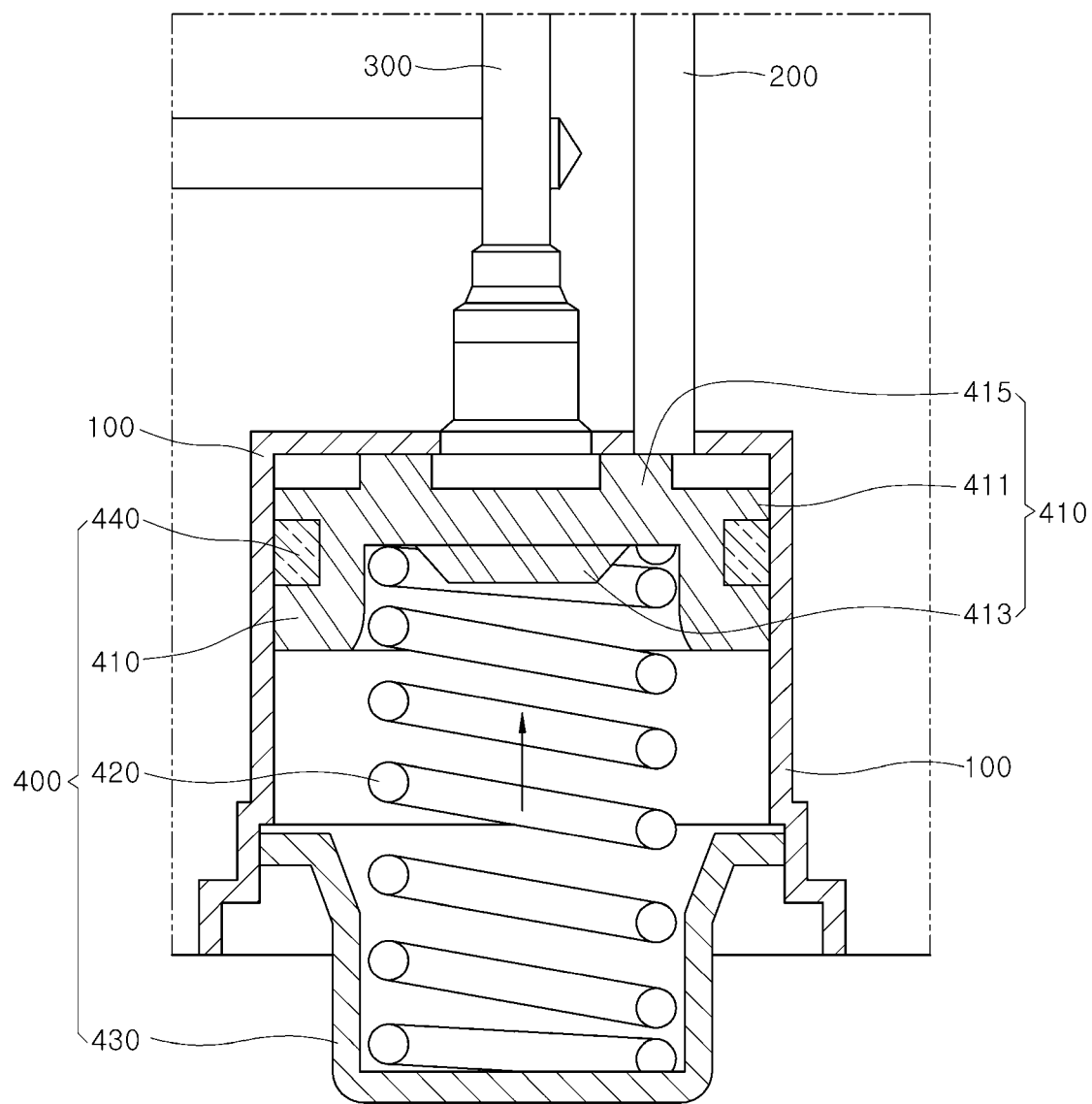

FIG. 1 is a perspective view schematically illustrating a hydraulic unit of a brake system in accordance with an embodiment of the present disclosure, FIG. 2 is a cross-sectional view schematically illustrating the hydraulic unit of the brake system in accordance with the embodiment of the present disclosure, FIG. 3 is an expanded cross-sectional view schematically illustrating a part of the hydraulic unit of the brake system in accordance with the embodiment of the present disclosure, FIG. 4 is a cross-sectional view schematically illustrating a hydraulic unit of a brake system in accordance with another embodiment of the present disclosure, and FIGS. 5 and 6 are cross-sectional view schematically illustrating an operation of the hydraulic unit of the brake system in accordance with the embodiment of the present disclosure.

Referring to FIGS. 1 to 6, the hydraulic unit of the brake system in accordance with the embodiment of the present disclosure includes a housing 100, an oil supply part 200, an oil discharge part 300 and a piston 400.

The housing 100 has an internal space therein. A portion (right side in FIG. 1) of the top of the housing 100 communicates with the oil supply part 200, and another portion (center in FIG. 1) of the top of the housing 100 communicates with the oil discharge part 300. Communication may refer to the input and output of oil into the housing 100 from the oil supply part 200 and from the housing 100 into the oil discharge part 300. The housing 100 stores oil, supplied from the oil supply part 200, in the internal space thereof, and discharges oil toward the oil discharge part 300. In the present disclosure, the housing 100 constitutes a body of an accumulator.

In the present disclosure, oil may indicate operating fluid supplied toward a wheel of a vehicle through the oil discharge part 300, and fluids other than oil may be used.

The oil supply part 200 communicates with the housing 100, and supplies oil to the housing 100. The oil supply part 200 may have a valve (not illustrated) installed therein to adjust the supply of the oil. The oil supply part 200 supplies hydraulic pressure of the wheel (not illustrated) of the vehicle to the housing 100 through the valve.

In the present disclosure, when braking pressure supplied to the wheel of the vehicle is to be reduced by the ABS (Anti-lock Brake System) of the vehicle or a regenerative braking function, the oil supplied to the wheel of the vehicle is supplied to the housing 100 through the oil supply part 200. When a pump (not illustrated) is operated, the oil within the housing 100 is discharged through the oil discharge part 300 connected to a suction side of the pump, and returned to an oil storage part (not illustrated).

The oil discharge part 300 communicates with the housing 100, and discharges oil, supplied to the housing 100 from the oil supply part 200, to the outside of the housing 100. The oil discharge part 300 is connected to the suction side of the pump for returning the oil, supplied to the housing 100, to the oil storage part. The oil discharge part 300 is connected to the suction side of the pump, such that the oil of the housing 100 is returned to the oil storage part through an operation of the pump.

In the present disclosure, the oil supply part 200 is disposed to communicate with one surface (top surface in FIG. 2) of the housing 100, and the oil discharge part 300 is separated from the oil supply part 200, and disposed to communicate with the one surface (top surface in FIG. 2) of the housing 100. The oil supply part 200 and the oil discharge part 300 are disposed to communicate with the same surface of the housing 100.

The oil supply part 200 and the oil discharge part 300 are disposed to communicate with the same top surface of the housing 100, and are to be opened and closed according to whether the oil supply part 200 or the oil discharge part 300 is contacted with the piston 400 which is moved in the housing 100.

The piston 400 includes an opening and closing part 410, a support part 430 and an elastic part 420. The opening and closing part 410 is movably mounted in the housing 100, and opens and closes the oil supply part 200 and the oil discharge part 300.

The support part 430 is fixed to the inside of the housing 100, and supports one side (bottom side in FIG. 2) of the elastic part 420. The support part 430 may be fixed to the housing 100 by welding or bolting.

The elastic part 420 has the one side (bottom side in FIG. 2) supported by the support part 430 and the other side (top side in FIG. 2) contacted with the opening and closing part 410, and is configured to provide an elastic force to the opening and closing part 410. The elastic part 420 is compressed by oil supplied to the internal space of the housing 100 through the oil supply part 200.

When the oil of the housing 100 is discharged through the oil discharge part 300, the compressed elastic part 420 lifts the opening and closing part 410 using an elastic restoring force, such that the opening and closing part 410 is contacted with both the oil supply part 200 and the oil discharge part 300. Movement of the opening and closing part 410 may be in an up and down direction when viewed in the orientation illustrated in FIG. 2, for example.

The opening and closing part 410 lifted by the elastic restoring force may be contacted with the oil supply part 200 and the oil discharge part 300, and block a flow path between the oil supply part 200 and the oil discharge part 300, such that negative pressure generated by the pump can be prevented from being transferred to the wheel of the vehicle.

In the present disclosure, the opening and closing part 410 includes an opening and closing body 411, a stopper 413 and an opening and closing protrusion 415. The opening and closing body 411 is moved inside the housing 100. The opening and closing body 411 is formed in a cylindrical shape. An upper portion of the body 411 may surround or encircle at least one oil discharge part 300. The opening and closing body 411 has an outer diameter corresponding to the inner diameter of the housing 100 so as to be movable in the internal space of the housing 100. That is, the outer diameter of the opening and closing body 411 is slightly smaller than the inner diameter of the housing 100.

The stopper 413 is formed on one side (bottom side in FIG. 2) of the opening and closing body 411, and blocks the elastic part 420 from separating from the opening and closing body 411. The stopper 413 protrudes from one surface (bottom surface in FIG. 2) of the opening and closing body 411. A lower portion of the opening and closing body 411 may surround an upper portion of the elastic part 420. As the inside of the elastic part 420 surrounds the stopper 413 and the outside of the elastic part 420 is surrounded by the inside of the opening/closing body 411, the side-to-side movement or separation of the elastic part 420 is prevented.

The opening and closing protrusion 415 protrudes from the other side (top side in FIG. 2) of the opening and closing body 411, surrounds the oil discharge part 300, and can be contacted with the oil supply part 200. When the opening and closing protrusion 415 is contacted with the oil supply part 200, the opening and closing protrusion 415 blocks a flow path which the oil discharge part 300 and the oil supply part 200 are connected.

The opening and closing protrusion 415 is contacted with the oil supply part 200 while surrounding the oil discharge part 300, and blocks a connection flow path between the oil supply part 200 and the oil discharge part 300. Thus, negative pressure, which is generated in the oil discharge part 300 connected to the suction side of the pump while the pump is operated, is not transferred to the oil supply part 200. Therefore, negative pressure is not generated toward the wheel of the vehicle.

In the present disclosure, the opening and closing protrusion 415 is disposed to surround the oil discharge part 300, and contacts with the oil supply part 200 such that a part of the oil supply part 200 is exposed.

The opening and closing protrusion 415 may secure an exposure area of the oil supply part 200, thereby securing movement responsiveness of the opening and closing part 410. That is, a part of the oil supply part 200 is exposed by the opening and closing protrusion 415, such that oil supplied from the oil supply part 200 presses the opening/closing body 411. Therefore, the opening and closing body 411 is lowered by the pressing oil.

When the braking pressure of the wheel of the vehicle needs to be reduced, the valve is opened to supply oil to the housing 100 through the oil supply part 200. At this time, the opening and closing part 410 of the piston 400 is lowered by the oil introduced through the oil supply part 200 (see FIG. 5).

When the pump is operated to return the oil, introduced into the housing 100, to the oil storage part, the oil of the housing 100 is discharged through the oil discharge part 300 connected to the suction side of the pump. As the oil is discharged from the housing 100, the opening and closing part 410 of the piston 400 is lifted by the elastic restoring force of the compressed elastic part 420 at the bottom of the opening and closing part 410 of the piston 400.

The lifted opening and closing part 410 blocks the flow path between the oil supply part 200 and the oil discharge part 300 while abutting on the inner surface of the housing 100. As the opening and closing part 410 blocks the flow path between the oil supply part 200 and the oil discharge part 300, negative pressure, generated in the oil discharge part 300 while the pump is operated, is not transferred toward the oil supply part 200. Therefore, the negative pressure is not generated toward the wheel of the vehicle.

Referring to FIG. 4 illustrating another embodiment of the present disclosure, the opening and closing protrusion 415 includes an inclined part 416. The inclined part 416 is formed on the opening and closing protrusion 415 so as to be inclined downward toward the outside from the oil discharge part 300. As the inclined part 416 is formed on the opening and closing protrusion 415, the exposure area of the oil supply part 200 can be secured more than in the above-described embodiment, which makes it possible to secure the movement responsiveness of the opening and closing part 410.

That is, the oil supplied through the oil supply part 200 presses the opening and closing body 411 while flowing down along the inclined part 416. Therefore, the opening and closing body 411 is lowered by the pressing oil.

In the present disclosure, the elastic part 420 is configured as a coil spring to surround the outer surface of the stopper 413. That is, the inside of the elastic part 420 is locked to the outer surface of the stopper 413, and the outside of the elastic part 420 is locked to the inner surface of the opening and closing body 411, such that the elastic part 420 is prevented from separating.

In the present disclosure, the piston 400 further includes a sealing part 440. The sealing part 440 is mounted on the outer surface of the opening and closing body 411, and blocks oil leakage between the opening and closing body 411 and the housing 100. The sealing part 440 is inserted and mounted into a groove formed on the outer surface of the opening and closing body 411. The sealing part 440 may be disposed between the protrusion 415 and a lower portion of the opening and closing part 410.

The sealing part 440 is formed of an elastically deformable material. In the present disclosure, the sealing part 440 may be formed of an elastically deformable material such as rubber or silicone. The sealing part 440 is mounted on the outer surface of the opening and closing body 411, and fills the gap between the housing 100 and the opening and closing body 411 which is moved upward and downward inside the housing 100, thereby blocking oil leakage.

The operation of the hydraulic unit of the brake system in accordance with the embodiment of the present disclosure will be described with reference to FIGS. 5 and 6.

Referring to FIG. 5, when the braking pressure of the wheel of the vehicle needs to be reduced, the valve is opened, and oil is introduced into the internal space of the housing 100 between the upper surface of the housing 100 and the top surface of the opening and closing part 410 through the oil supply part 200. The opening and closing part 410 of the piston 400 is pushed downward by the oil supplied through the oil supply part 200. At this time, the elastic part 420 is compressed by the opening and closing part 410 moved downward.

The oil supplied to the internal space of the housing 100 is discharged to the outside of the housing 100 through the oil discharge part 300, and returned to the oil storage part.

Referring to FIG. 6, the oil supplied to the housing 100 from the oil supply part 200 is discharged through the oil discharge part 300. At this time, the opening and closing part 410 is lifted by the elastic restoring force of the elastic part 420, and closes the flow path between the oil supply part 200 and the oil discharge part 300.

In the hydraulic unit of the brake system in accordance with the embodiment of the present disclosure, the connection flow path between the oil supply part 200 and the oil discharge part 300 may be closed by the operation of the piston 400, which makes it possible to prevent negative pressure, generated by the pump, from being transferred toward the wheel of the vehicle.

Furthermore, because the flow path between the oil supply part 200 and the oil discharge part 300 is opened and closed by the operation of the piston, the unit cost of the product can be reduced to improve the productivity.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A hydraulic unit of a brake system, comprising:
a housing including an inner surface having a first diameter;
an oil supply part configured to supply oil to the housing, wherein the oil supply part is disposed to communicate with the housing;
an oil discharge part disposed in a center region of the housing and configured to discharge the oil to an outside of the housing, wherein the oil discharge part is separated from the oil supply part, and disposed to communicate with the housing;
a piston movably mounted on the housing, and configured to open and close the oil supply part and the oil discharge part, wherein the piston comprises:
an opening and closing part movably mounted in the housing, and configured to open and close the oil supply part and the oil discharge part;
a support part fixed to the inside of the housing that tapers to a second diameter less than the first diameter;
an elastic part having one side supported by the support part and the other side contacting the opening and closing part, and configured to provide an elastic force to the opening and closing part; and
a sealing part mounted on an outer surface of the opening and closing part to contact the inner surface having the first diameter of the housing,
wherein the opening and closing part comprises:
an opening and closing body formed in a cylindrical shape and moved in the housing while abutting on the inner surface of the housing; and
an opening and closing protrusion protruding from another side of the opening and closing body, surrounding the oil discharge part, capable of contacting the oil supply part, and configured to block a flow path to which the oil discharge part and the oil supply part are connected, when contacted with the oil supply part,
wherein the opening and closing protrusion has an inclined part which is inclined downward toward the outside from the oil discharge part,
wherein an upper end of the inclined part is contacted with the oil supply part so as to expose a part of the oil supply part,
wherein the housing includes at least one step portion having a third diameter wider than the first diameter,
wherein the support part is fixed to an inside of the step portion, and
wherein the oil supply part is disposed between the oil discharge part and the inner surface of the housing.

2. The hydraulic unit of claim 1, wherein the opening and closing part further comprises a stopper formed on one side of the opening and closing body, and configured to block the elastic part from separating from the opening and closing body.

3. The hydraulic unit of claim 2, wherein the elastic part is configured as a coil spring to surround an outer surface of the stopper.

4. The hydraulic unit of claim 2, wherein the sealing part is configured to block oil leakage between the opening and closing body and the housing.

5. The hydraulic unit of claim 1, wherein the opening and closing protrusion is not contacted with the oil discharge part.

* * * * *